June 14, 1949.  L. S. BURGETT  2,473,360
BRAKE
Filed Nov. 28, 1945  2 Sheets-Sheet 1

INVENTOR.
Lynn S. Burgett
BY Harry P. Canfield
ATTORNEY

June 14, 1949.  L. S. BURGETT  2,473,360
BRAKE

Filed Nov. 28, 1945  2 Sheets-Sheet 2

INVENTOR.
Lynn S. Burgett
BY Harry R. Canfield
ATTORNEY

Patented June 14, 1949

2,473,360

UNITED STATES PATENT OFFICE 2,473,360

BRAKE

Lynn S. Burgett, Bakersfield, Calif., assignor to The Clark Controller Company, Cleveland, Ohio, a corporation of Ohio Application November 28, 1945, Serial No. 631,332

12 Claims. (Cl. 188—75)

This invention relates to brakes of the class in which friction brake shoes are pressed into engagement with and retracted out of engagement from a brake drum.

This application is a continuation-in-part of my co-pending application, Serial Number 492,-512, filed June 28, 1943, now Patent No. 2,436,880, dated March 2, 1948.

The brake shoes of brakes of the class referred to are commonly designed to extend for a considerable angular distance around the drum, and are provided with arcuate friction linings to engage the drum; and to maintain the most effective contact between the drum and the linings, the shoes are pivotally supported behind the linings so as to be free to rock on their pivots, and align themselves with the drum, when moved into engagement with it.

When, however, the shoes are retracted from the drum to release the brake (and in the absence of other provisions), the shoes may rock on their pivots by gravity and cause one arcuate tip of the lining to drag on the rotating drum. This is in general bad practice, but is bad particularly because it wears the linings unevenly so that when they engage the drum, contact with it is made on only a portion of the angular extent of the lining, and this reduces the braking action.

This indicates the need of some means to hold the linings away from and clear of the drum when retracted, without interfering with their self-aligning pivotal movement; and which means will function equally well when the brake linings are new and thick, and after they have worn and become thin.

Various devices have been proposed to accomplish these ends, but all such devices so far as I am aware, have been found in practice to be objectionable in various respects.

The primary object of the present invention is to provide such a device or means, free from the objections to prior devices.

Another object is to provide such a device or means which will be applicable with advantages to brakes of this class in which the brake shoes are set by a spring arrangement and released by an electromagnet.

In such electromagnetic brakes, as the brake linings wear, the electromagnetic operating air gap increases, and provision is usually made to restore the original gap by adjustment of the shoes, to their original clearance with the drum; and any device for accomplishing the aforesaid ends must not interfere with this adjustment; and it is a further object of the invention to attain this result.

For the above mentioned reasons, the full advantages of the invention are best developed in an electromagnetic type of brake, and I have therefore herein illustrated and described the invention as applied to such a brake.

Besides the foregoing objects, others will become apparent hereinafter to those skilled in the art to which my invention appertains.

The invention is fully disclosed in the following description taken in connection with the accompanying drawing, in which.

Figures 1, 2, 3:
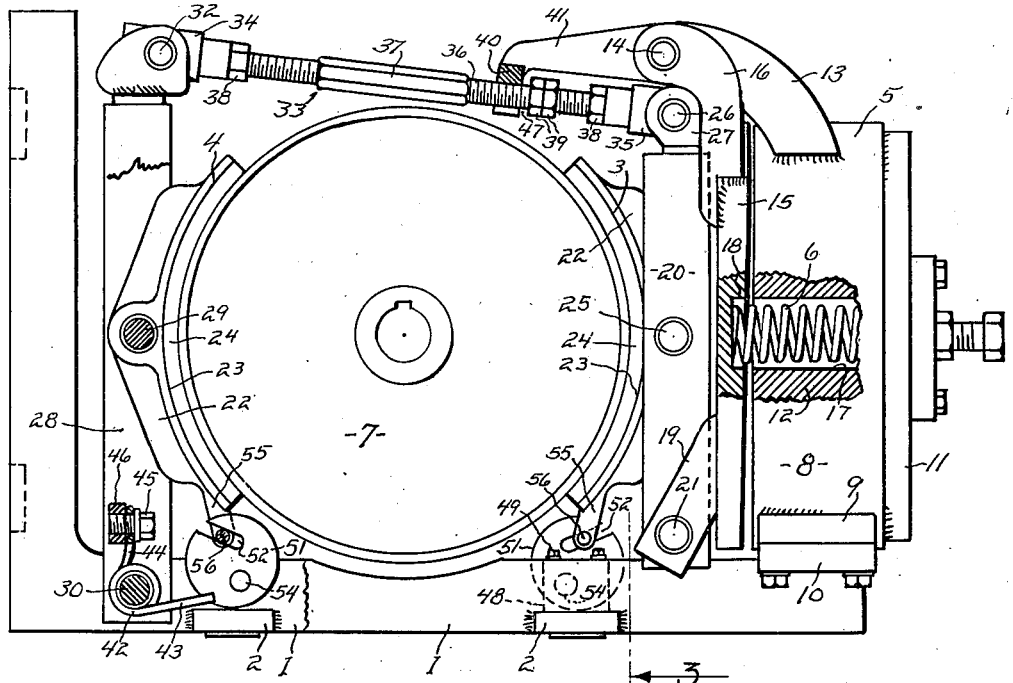
Fig. 1 is a front elevational view, with parts in broken section, of an electromagnetic brake in which my invention is embodied.
Fig. 2 is a top plan view of the parts of Fig. 1.
Fig. 3 is a fragmentary sectional view taken from the plane 3 of Fig. 1.
Figure 4:
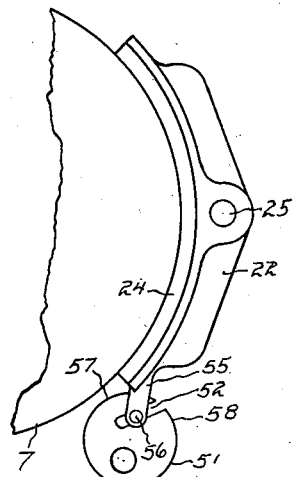
Figs. 4 and 5 are views of a part of Fig. 1 illustrating a part of the operative features of my invention with brake shoes having new and thick linings.
Figure 5:
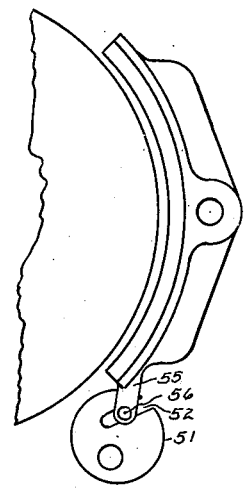
Figure 6:
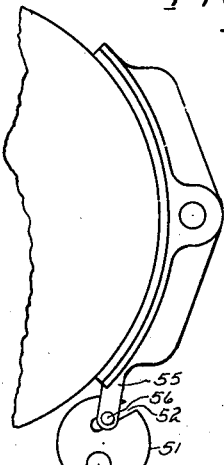
Figs. 6 and 7 are views similar to Figs. 4 and 5 but with the brake linings worn until thin.
Figure 7:
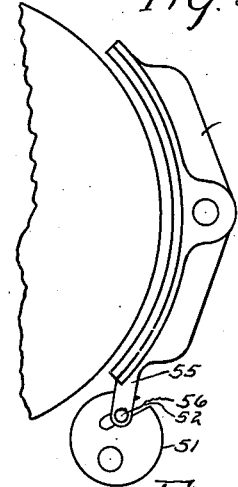

Referring to Fig. 1 of the drawing, which illustrates an electromagnetic brake, it will be seen that the brake mechanism is of the unitary type by which it may be transported and mounted in position as a unit; and to this end the parts of the mechanism are assembled upon a main frame or base. This frame or base may be variously constructed, but I prefer to provide therefor a pair of longitudinal steel base members 1—1, Figs. 1 and 3, transversely spaced apart and rigidly connected together by a pair of longitudinally spaced apart transverse base members 2—2.

As indicated hereinbefore, the brake is of the type comprising brake shoes frictionally engaging the periphery of a brake drum, a spring to set the brake shoes into braking engagement with the drum, and an electromagnet to disengage them; and at 3 and 4, I have shown the brake shoes, and at 5, I have shown generally the electromagnet, and at 6 the said spring; and at 7 the brake drum. The mechanism by which the brake shoes are engaged with or disengaged from the drum will now be described.

This application being a continuation-in-part of my aforesaid copending application to which reference may be made, some of the following description will be given more briefly than would otherwise be necessary; particularly as to certain parts on the back side of Fig. 1 not shown but duplicating parts on the front side that are shown.

The magnet 5 has an outer steel magnetic shell 8 to a lower portion of which feet 9 are welded, and these feet are bolted to brackets 10 on the longitudinal base members 1—1 whereby the shell is rigidly connected to the base members. To facilitate manufacture, the brackets 10 may be made of steel and welded to the base members, and the feet 9 may be secured to the brackets by bolts projected therethrough as shown.

The shell 8 is preferably made in the form of a band or hollow cylinder of steel and the right hand end as viewed in Fig. 1 is closed by an end plate 11 preferably welded thereto. Within the shell is a magnet core 12 and a magnet winding not shown but surrounding the core.

Projecting upwardly and forwardly from the magnet shell 8 is a pair of armature supporting arms 13—13, supporting an armature shaft 14, and the armature supporting arms 13—13 are preferably provided by making them from steel and welding them to upper portions of the magnet shell 8.

A magnet armature 15 is provided, in the form of a steel disc confronting the magnet and mounted to swing toward and from the magnet by means of armature arms 16—16 preferably formed from steel and welded to upper portions of the armature and bending forwardly and upwardly and at their end portions and pivotally supported on the shaft 14 whereby the armature is mounted to swing on the shaft.

The magnet core 12 has a bore 17 extending co-axially therethrough and the aforesaid spring 6, preferably a helical compression spring, is disposed in this bore with one end lodged in a recess 18 in the armature 15 and with the opposite end engaging an abutment not shown.

It will be seen from the foregoing (and particularly with reference to the said copending application wherein more details of the magnet are shown) that when the magnet is energized, the magnet armature 15 will be moved or swung counterclockwise; and that when the magnet is de-energized the spring 6 will move the armature 15 clockwise; and the mechanism causes this movement to respectively release the brake shoes from the drum or set them in braking engagement therewith.

Projecting downwardly and forwardly from the lower portion of the armature 15 is a pair of transversely spaced arms 19. Pivotally supported on these arms is a substantially vertically extending frame shown generally at 20; the lower end portion of the frame 20 being pivoted to the said arms 19 by pins 21. One of the brake shoes, 3, is mounted upon this frame 20. The brake shoes 3 and 4 may be in general of known construction and the exact form and construction thereof constitutes no part of the present invention, and they therefore may comprise a brake shoe body 22 having an arcuate portion 23 and a brake shoe lining 24 concentric with the drum and engageable therewith. On a lower portion of the brake shoe body is a device co-operating with a device on the main frame, which does constitute part of the present invention and will be described later.

The said brake shoe 3 is pivotally mounted on the frame 20, by a pin 25 projecting through the frame 20, and through the shoe body 22, and upon which the shoe body has oscillatory bearing.

At the upper end of the said frame 20 is a pivot bearing pin 26 and it is preferably supported by welding a pair of upwardly extending lugs 27—27 to the upper end of the frame 20 and providing co-axial bores in the lugs and disposing the pivot pin 26 therein.

The other brake shoe 4 on the left side of the mechanism as viewed in the drawing is also mounted on a frame shown generally at 28; and the brake shoe 4 is preferably like the shoe 3, and its body 22 is oscillatably mounted upon a pin 29 supported upon the frame 28. The frame 28 is pivotally connected to and supported upon the main frame by means of a pin or shaft 30 mounted on the longitudinal base members 1—1.

Upon the upper end of the frame 28 is provided a pivot bearing and it preferably consists of a pair of lugs 31—31 supporting a transverse pivot pin 32.

The pivot pins 26 and 32 above described are connected with each other by a linkage or tie rod of adjustable length shown generally at 33. Adjustment of the length of this tie rod may be provided by various means but I prefer to make it of generally the turn-buckle type and to this end, I preferably provide a tie rod head 34 having bearing on the pin 32, a tie rod head 35 having bearing on the pin 26, a turn-buckle 36 having right hand threads on one end and left hand threads on the other threaded respectively into the heads 35 and 34, and having an intermediate portion 37 of hexagonal or other polygonal cross-section suitable to be gripped by a wrench for turning the bolt; and lock nuts 38—38 on the threads, which may be turned to lockingly engage the said heads and bolt thread to lock the bolt in adjusted rotational positions.

On the threaded end of the bolt 36, which is screwed into the head 35, is a pair of lock nuts 39—39, which may be unlocked from each other, and, by turning them, moved along to different positions on the threads and then locked in such position, and when so locked they provide an abutment on the bolt, and this abutment co-operates with a stop shown generally at 40.

This stop is preferably stationary relative to the main frame of the structure and, for a purpose to be referred to, it is desirable that it be removable, and to this end the preferred construction is to provide as shown a U-form member 40, the legs of which are pivotally supported upon the pin 14 and the closed end of the U carrying the stop 40, the latter being in the form of a downwardly open fork embracing the turn-buckle rod on the left hand side of the lock nuts 39—39 and engageable thereby.

In the lower left hand corner of Fig. 1, is shown a spring 42 having a main body portion of helical form telescoped upon the shaft 30 and having free end portions 43 and 44, the end 43 lying upon any suitable abutment on the main frame, for example lying upon the adjacent traverse member 2; and the other end 44 being formed into an eye and secured to the frame 28, by means of a bolt 45 projected through the eye and threaded into a lug 46 on the frame 28. This spring 42 is formed so that it is under tension when installed as just described to exert a counterclockwise resilient torque on the frame 28 tending to rotate it in the counterclockwise direction about its lower pivot support or shaft 30.

The operation of the mechanism as thus far described will now be given, considering the parts as moving from the brake disengaged position to the engaged position illustrated in Fig. 1.

When the magnet is de-energized to allow the brake to set, the spring 6, reacting upon the magnet armature 15, swings it clockwise around its supporting pivot 14 and thereby moves the pivot 21 at the lower end of the frame 20 toward the left as viewed in the drawing. Momentarily, the pivot 26 at the upper end of the frame 20 is held toward the left as viewed in the drawing by the spring 42 in the lower left hand corner, which as described, holds the frame 28 counterclockwise on its pivot 30 thereby holding the left hand brake shoe 4 away from the drum 7 and thereby pulling toward the left on the tie rod 33 and holding the locked nuts 39 against the stop 40 and, as stated, holding the pivot 26 toward the left.

The frame 20 therefore pivots around the pivot 26 in the clockwise direction, which moves the brake shoe pivot 25 toward the left, engaging the right hand brake shoe 3 with the drum 7. Continued swinging movement of the armature 15 now causes the frame 20 to be pivoted around the brake shoe pivot 25, which moves the pivot 26 toward the right as viewed in the drawing and this movement acting through the tie rod 33 rocks the frame 28 clockwise on its pivot 30 against the tension of the spring 42 and moves the left hand brake shoe 4 into engagement with the drum. Both brake shoes are thereby frictionally engaged with the drum by the tension of the spring 6, the degree of the braking friction being determined by the tension of the spring 6 which may be adusted by well known means, or as described in said copending application. These movements also remove the lock-nuts 39—39 away from the stop 40 leaving a clearance space 47 therebetween.

Upon energizing the magnet to release the brake, the reverse of these movements takes place, the spring 42 contributing to the movement of the shoe 4 from the drum and the engagement of the lock-nuts 39—39 with the stop 40 contributing to the release of the shoe 3. The adjustments provided in the mechanism above described will now be considered.

It may be stated here that the pressure engagement of the two brake shoes with the drum is automatically equalized by the inherent arrangement of the parts. This may be variously described, but one way to state it is that one brake shoe after engagement with the drum functions as a fulcrum for a lever system for engaging the other brake shoe and the leverage system has a one-to-one ratio.

When the brake mechanism is first installed for operation, the brake shoe linings being new are relatively thick and the brake shoes must be positioned so that the linings will not drag upon the drum when the brake shoes are released; and after a period of use the brake shoe linings, and to some extent the drum, wear and hence it is desirable to be able to adjustably move the brake shoes toward and from the drum to provide an optimum amount of clearance therebetween at the start of use and from time to time as wear develops.

Also, it is important to be able to adjustably position the brake shoes so that the clearance between one brake shoe and the drum is the same as between the other and the drum.

In the mechanism here described, the amount of clearance of the brake shoes with the drum is determined by the length of the tie rod 33 which in turn may be varied by turning the turn-buckle bolt 36 in one direction or the other; and the equalization of the two clearances is determined by moving the lock nuts 39 along the turn-buckle thread in one direction or the other.

To illustrate, if we assume that the magnet is energized to release the brake shoes, and the armature 15 is accordingly held against the magnet, this will determine a position for the pivot 21. The spring 42 will retract the left hand brake shoe 4 until the lock nuts 39—39 engage the stop 40, thereby holding the left hand brake shoe 4 away from the drum and rocking the upper end of the frame 20 counterclockwise to pull the right hand brake shoe toward the drum. The positions of the brake shoes relatively to the drum are thus determined when the lock nuts 39—39 engage the stop 40, and obviously, if the clearances of the brake shoes with the drum are not equal they may be equalized by moving the lock nuts one way or the other along the thread of the tie rod.

It is believed obvious that the clearance or distance between the shoes and the brake drum, after they have been equalized will be determined by the total length of the tie rod 33 between its pivots 32 and 26 and this can be adjustably changed by turning the tie rod in one direction or the other as described; the pitch of the right hand and left hand threads of the tie rod would, of course, be alike so that turning the rod to change the clearance does not change the equality of the clearance already predetermined by the adjustment of the lock nuts 39.

It has been found that when the clearances of the two shoes with the drum have once been equalized as just described, it does not change over a long period of use, if ever, in the life of the brake, and to keep the brake shoes in proper clearance relation with the drum both at the start of use when the brake is first installed and to take up for wear in use, the only adjustment necessary is that effected by turning the turnbuckle bolt 33; and this adjustment is located on the outside of the apparatus, where access to it may be freely and conveniently had.

It is to be noted also that the amount of the clearance space 47 between the lock nuts 39 and the stop 40 when the brake is set, indicates the amount of wear on the brake shoes.

In prior brakes, various other adjustments have been provided and have been necessary, because the readjusting of the brake shoes for wear has thrown other parts out of adjustment and they have had to be concurrently readjusted, such other readjustment including in some cases adjustment of the spring which sets the brake, adjustment of the air gap between the armature and the magnet, restoring of the equality of clearance between the respective shoes and the drum etc.

In the present brake, however, when these quantities and relations have once been established in the brake, they may change perceptibly from their original states as the brake shoes wear, but when the brake shoes are brought back to their original clearance to compensate for wear, and by the one simple adjustment above described, these other quantities are thereby restored to their original state or condition. For example, as the brake shoes wear in use, the armature 15 tends to move farther and farther away from the magnet and the spring 6 becomes more elongated and exerts a lesser braking force; and because of the greater gap thus effected between the armature and the magnet the action of the magnet may become more sluggish upon releasing the brake; but all of these factors are restored to their original optimum condition, when the brake shoes are readjusted for wear and all of this is accomplished by the one simple adjustment described.

In the present brake construction, as in other brakes in which the brake shoes are pivoted rearwardly of the brake shoe linings, in order that they may float, and always conform to the contour of the drum, the shoes tend to rotate on their pivots by gravity and tend to cause the upper part of the brake lining to ride on the drum and wear it more than the rest of the lining, which, of course, reduces the effective braking area of the lining; and this is overcome in the present brake by the following construction, comprising the devices illustrated in Fig. 1 directly under the lowermost portions of the brake shoes.

These devices are preferably alike and a description of one of them will therefore suffice. Reference may also be had to Figs. 3, 4, 5, 6, and 7.

A bearing block 48 is mounted on the main frame, preferably upon the transverse brace member 2, by bolts or the like 49, and a pivot pin 50 is mounted thereon extending laterally therefrom; and on the pin is mounted for oscillatory movement a disc 51 having a slot 52 extending inwardly from its periphery at an angle to the radius of the disc, and the bearing of the disc on the pin is preferably below its center. A spring 53 surrounding the pin reacts upon the disc and upon an enlarged pin head 54 and holds the disc in frictional engagement with the block 48.

A finger construction 55 on the lower end of the brake shoe carries a pin 56 lying transversely in the slot 52.

In the operation of this device, when the brake shoe is retracted to release the brake, the brake shoe pivot pin, for example the pin 25 moves radially away from the drum. If the shoe should tend to rotate by gravity around the pin 25, as referred to, the pin 56 prevents it, by its engagement with the lower side of the slot 52. This action is shown diagrammatically in Figs. 4 and 5 in going from Fig. 4 to Fig. 5. In these two figures and in Fig. 1, the slot 52 is shown in the position, which it would assume when the brake shoe linings 24 are relatively new and thick.

In order for the shoes to be stopped effectively from rotating by gravity as referred to, and in order for all points of the shoe to always reengage the drum substantially simultaneously, the surface engaged by the pin 56 upon retraction of the shoe, should be changed in position as the shoes wear and as the position of the pin 56 accordingly changes. This is accomplished by providing the pin engaging surface as the lower side of a slot 52, and by utilizing the pin and the upper side of the slot to gradually reposition the slot as the shoes wear.

By means of the frictionally yielding support for the disc, each time that the brake shoe is moved to its braking position, and as the shoe lining wears, the pin 56 by engagement with the upper side of the slot 52 gradually rotates the disc and the slot around its frictional pivot. After the brake linings have worn a great deal, the disc and the disc slot will be in the positions indicated diagrammatically in Figs. 6 and 7; where again in going from Figs. 6 to 7 the above described action of preventing the shoe from rotating by gravity is performed. The device thus not only prevents the gravitational fall or drooping of the brake shoes when in their released condition, but automatically compensates and adjusts itself for wear of the brake shoes so that it operates with equal effectiveness for all thicknesses of brake shoe linings.

Furthermore, by disposing the slot 52 at an angle to the direction of movement of the pin 56, the pin is able to exert torque on the disc to rotate it; and also with the slot at an angle, the shoe when retracting the pin 52, pivots, slightly about the pin, thus insuring that the upper parts of the shoe will re-engage the drum substantially simultaneously with the lower parts.

It is not essential that the disc 51 be circular as shown; in fact it is not essential that it be in any sense a disc. A disc has been shown because this is the most convenient form or shape to manufacture and because it is the most convenient way to provide surfaces 57 and 58, see Fig. 4, at the sides of the slot for the following purpose. When assembling the brake shoe on its own pivot pin 25, the pin 56 should first be placed in the slot 52, otherwise, for the optimum shape and direction of the slot 52 it might be impossible to position the pin 56 in its slot. By providing the said surfaces 57 and 58, the engagement of the pin with these surfaces will make it impossible to insert the brake shoe pivot pin 25. These surfaces therefore compel the assembler to first put the pin 56 in its slot 52 before inserting the brake shoe pivot pin 25 so that both pins are sure to be properly assembled with their coordinate parts.

It is believed therefore that it will now be apparent that the surfaces 57 and 58 are not essential; but that when they are provided they compel a proper assembly of the parts the first time; thereby avoiding trial and error; and that when these surfaces are provided they may be provided by any suitable configuration of the material in which the slot 52 is provided.

As mentioned above the clearance space 47 in Fig. 1 when the brake is set, indicates the amount of wear on the brake shoes, this space becoming greater as they wear.

The size of this space may be observed as indicating when the wear and clearance has increased to the point at which the shoes should be readjusted, to take up for the wear and restore the original shoe clearance.

Figure 8:
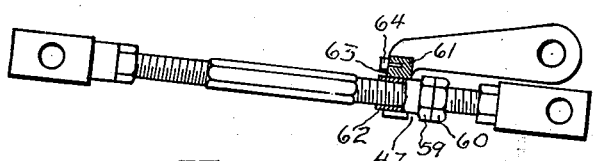
Fig. 8 is a view similar to a part of Fig. 1, illustrating a modification.

In Fig. 8 is illustrated a modification in which a gage is provided to measure and indicate the amount of this clearance and wear and to indicate when the brake shoes should be readjusted.

In place of the two lock nuts 39—39 of Fig. 1, two lock nuts 59 and 60 are provided to engage a stop 61 corresponding to the stop 40 of Fig. 1; and the nut 59 has a sleeve 62 thereon extending through the stop and beyond its inner face 63. When the clearance space at 47 corresponds to brake shoes having the correct clearance with the drum, this sleeve projects beyond the inner face 63 of the stop 61 a predetermined amount as shown; and a flat headed rivet 64 is provided on the stop 61 so that the end of the sleeve 62 is adjacent to and flush with or coplanar with the top of the rivet.

As the brake linings wear, the clearance space 47 gradually increases and the end of the sleeve 62 gradually retreats toward the inner face 63 of the stop 61; and when it comes flush with the face 63 that fact is an indication that the shoes should be readjusted to be nearer the drum.

In adjusting the shoes, they can be adjusted closer to the drum as described until the end of the sleeve 62 is again flush with the rivet head 64, as an indication that they are again in the correct clearance positions.

My invention is not limited to the exact details of construction, proportions and relation of parts, illustrated and described. Changes and modifications may be made, and my invention comprehends all such modifications and changes which come within the scope of the appended claims.

I claim:

1. In a brake construction of the type comprising a frame and a pivotally supported brake shoe having an arcuate, frictional braking surface for engagement with a brake drum, and means to reciprocate the pivot support of the shoe away from and toward the brake drum to respectively release and brake rotation of the drum by the arcuate surface; a movable element supported by the frame, friction means resisting movement of the element and yieldably frictionally maintaining it in moved position; a guide on the brake shoe spaced from the shoe pivot; a guideway on the element for the guide; the guide and guideway constructed to constrain both ends of the arcuate surface to move simultaneously out of engagement with the drum upon reciprocation of the shoe pivot support away from the drum, and to react upon each other to cause the element to be gradually moved to different frictionally maintained positions to gradually reposition the guideway, upon gradually changing proximity of the shoe pivot support to the drum effected by wearing away of the arcuate surface, to maintain said constraining action as the arcuate surface wears away.

2. The combination with a brake drum, and a brake shoe having an arcuate frictional braking surface, and which is pivotally and reciprocably supported for engagement and disengagement of the arcuate surface with the drum, of a bearing disposed adjacent to the shoe; and element oscillatably supported on the bearing; friction means to yieldably resist oscillatory movement of the element; a guideway on the element; a guide carried by the shoe and spaced from the shoe pivot support and slidable on the guideway; the guideway being formed to control the movement of the guide occasioned by reciprocatory movement of the shoe, to constrain both ends of the arcuate surface to move simultaneously toward and from the drum; and the element being oscillatable in one direction, by the engagement of the guide and guideway upon reciprocation of the shoe to engage the arcuate surface with the drum, to gradually change the position of the guideway in correspondence with the gradually changing proximity of the shoe pivot to the drum caused by wearing away of the arcuate surface to continuously maintain the constraining action as the arcuate surface wears away.

3. The combination with a brake drum, and a brake shoe having an arcuate frictional braking surface, and which is pivotally and reciprocably supported for engagement and disengagement of the arcuate surface with the drum, of a bearing disposed adjacent to the shoe; and element oscillatably supported on the bearing; friction means to yieldably resist oscillatory movement of the element; a slot in the oscillatory element; a guide pin carried by the shoe and spaced from the shoe pivot support and slidable in the slot; the pin when in the slot being at one side of the axis of oscillation of the oscillatory element; the slot being formed so that upon reciprocation of the shoe away from the drum the pin has sliding engagement with one side of the slot and constrains both ends of the arcuate surface to move simultaneously away from the drum; and so that upon repeated reciprocations of the shoe to engage the arcuate surface with the drum, the pin by engagement with the other side of the slot upon reciprocation of the shoe causes the oscillatory element to gradually move to different oscillated positions corresponding to gradually changing proximity of the shoe to the drum caused by wearing away of the arcuate surface to thereby maintain said constraining action, as the arcuate surface wears away.

4. In a brake of the type comprising a stationary frame and a pair of brake shoes disposed on opposite sides of a brake drum and provided with arcuate friction surfaces, and movable toward and from the drum to engage and disengage the arcuate surfaces with the drum; pivot supports for the shoes behind the friction surfaces; each shoe having a guide-element oscillatably supported on the frame upon a bearing below the shoe pivot and provided with spring-engaged friction surfaces to hold it yieldably in oscillated positions; an open ended slot guideway in the guide-element; a pin guide on the shoe below its pivot and in the slot; the slot being between the guide-element bearing and the shoe pivot and inclined at an angle to the direction of movement of the shoe pivot, and the pin guide being movable along the slot during movement of the shoe toward and from the drum and guiding the shoe to cause both ends of the arcuate surface to move in unison.

5. In a brake of the type comprising a stationary frame and a pair of brake shoes disposed on opposite sides of a brake drum and provided with friction surfaces, and movable toward and from the drum; pivot supports for the shoes behind the friction surfaces; each shoe having a guide-element oscillatably supported on the frame upon a bearing below the shoe pivot and provided with spring-engaged friction surfaces to hold it yieldably in oscillated positions; an open ended slot guideway in the guide-element; a pin guide on the shoe below its pivot and in the slot; the slot being between the guide-element bearing and the shoe pivot and inclined at an angle to the direction of movement of the shoe pivot; the shoe pivot comprising axially alignable bearing elements; the said guide-element having surfaces at each side of the open end of the slot; the bearing elements of the shoe pivot being alignable only when the guide-element is oscillated to a position at which the pin guide can concurrently enter the slot, and prevented from being aligned when the guide-element is in any other oscillated position, by engagement of the pin guide and with one or the other of said surfaces.

6. In a brake of the type comprising a stationary frame; a brake shoe having an arcuate friction surface, and a pivot support for the shoe having a generally horizontal axis behind the arcuate surface, and brake operating means to reciprocate the pivot support toward and from a brake drum to reciprocate the shoe and engage and disengage the arcuate surface with the drum; a linear guideway supported by the frame below the brake shoe pivot axis; a guide on the brake shoe engageable with the guideway and slidable therealong during said reciprocations and the guideway positioned to constrain both ends of the arcuate surface of the shoe to move simultaneously into and out of drum engagement.

7. In a brake of the type comprising a stationary frame; a brake shoe having an arcuate friction surface, and a pivot support for the shoe having a generally horizontal axis behind the arcuate surface, and brake operating means to reciprocate the pivot support toward and from a brake drum to reciprocate the shoe and engage and disengage the arcuate surface with the drum; a linear guideway supported by the frame below the brake shoe pivot axis; a guide on the brake shoe engageable with the guideway and slidable therealong during said reciprocations; and the guideway positioned to constrain both ends of the arcuate surface of the shoe to move simultaneously into and out of drum engagement; friction means yieldably retaining the guideway in said position; and the guideway comprising a portion engageable by the guide upon engagement of the arcuate surface with the drum, to gradually move the guideway upon successive drum engagements to cause the guideway to maintain said constraining action as the arcuate surface gradually wears away.

8. The combination with a brake drum of a brake shoe having an arcuate friction surface; a generally horizontal pivot support for the shoe; brake operating means to reciprocate the pivot support toward and from the drum to engage and disengage the friction surface with the drum; the pivot support being generally horizontal and behind the arcuate surface whereby the shoe tends to rock by gravity to engage an upper portion only of the arcuate surface with the drum when the shoe pivot is moved away from the drum; means to prevent said rocking of the shoe and to cause all parts of the arcuate surface to move simultaneously toward and from the drum upon reciprocation of the shoe pivot, comprising: means provided with a linear guideway disposed in radially spaced relation to the shoe pivot and a guideway follower on the shoe; the guideway formed so that the follower engages it and prevents said rocking of the shoe, and concurrently slides therealong during reciprocation of the shoe pivot.

9. The combination with a brake drum of a brake shoe having an arcuate friction surface; a generally horizontal pivot support for the shoe; brake operating means to reciprocate the pivot support toward and from the drum to engage and disengage the friction surface with the drum; the pivot support being generally horizontal and behind the arcuate surface whereby the shoe tends to rock by gravity to engage an upper portion only of the arcuate surface with the drum when the shoe pivot is moved away from the drum; means to prevent said rocking of the shoe and to cause all parts of the arcuate surface to move simultaneously toward and from the drum upon reciprocation of the shoe pivot, comprising: a device supported on a bearing having a bearing axis generally parallel to the pivot axis and in radially spaced relation to the shoe pivot, and oscillatable to different positions on the bearing axis, and provided with friction means resisting oscillatory movements; the device provided with a linear guideway; a guideway follower on the shoe in engagement with the guideway; the guideway formed so that upon reciprocation of the shoe pivot toward and from the drum, the follower engaged with the guideway prevents said rocking of the shoe and concurrently slides along the guideway; and upon reciprocation toward the drum to engage the arcuate surface therewith, the follower by its engagement with the guideway may oscillate the device to a new oscillated position to reposition the guideway in correspondence with wear on the arcuate surface and the corresponding change of position of the follower.

10. The combination with a brake drum, of a brake shoe having an arcuate friction surface; a generally horizontal pivot support for the shoe; brake operating means to reciprocate the pivot support toward and from the drum to engage and disengage the friction surface with the drum; the pivot support being generally horizontal and behind the arcuate surface whereby the shoe tends to rock by gravity to engage an upper portion only of the arcuate surface with the drum when the shoe pivot is moved away from the drum; means to prevent said rocking of the shoe and to cause all parts of the arcuate surface to move simultaneously toward and from the drum upon reciprocation of the shoe pivot, comprising: means provided with a guideway recess disposed in radially spaced relation to the shoe pivot; and a guide projection on the shoe in the recess; the wall of the recess formed so that the guide projection engages it and prevents said rocking of the shoe, and concurrently slides along it during reciprocations of the shoe pivot.

11. The combination with a brake drum of a brake shoe having an arcuate friction surface; a generally horizontal pivot support for the shoe; brake operating means to reciprocate the pivot support toward and from the drum to engage and disengage the friction surface with the drum; the pivot support being generally horizontal and behind the arcuate surface whereby the shoe tends to rock by gravity to engage an upper portion only of the arcuate surface with the drum when the shoe pivot is moved away from the drum; means to prevent said rocking of the shoe and to cause all parts of the arcuate surface to move simultaneously toward and from the drum upon reciprocation of the shoe pivot, comprising: a device supported on a bearing having a bearing axis generally parallel to the pivot axis and in radially spaced relation to the shoe pivot, and oscillatable to different positions on the bearing axis, and provided with friction means resisting ocillatory movements; the device provided with a guideway slot; a guide pin on the shoe and in the slot, the slot so formed and positioned that upon reciprocations of the shoe pivot toward and away from the drum, the pin engages one side of the slot and prevents said rocking of the shoe and concurrently slides along the said side of the slot; and upon reciprocation of the shoe pivot toward the drum to engage the arcuate surface with the drum, the pin may engage the other side of the slot and oscillate the device to a new position to reposition the slot in correspondence with wear on the arcuate surface and the corresponding change of position of the guide pin.

12. In a brake construction of the type comprising a frame, and a pivotally supported brake shoe having an arcuate frictional braking surface for engagement with a brake drum, and operating means to reciprocate the pivot support to reciprocate the shoe toward and from the drum; mutually engaged guide means on the shoe and on the frame, guiding the reciprocatory movement of the shoe to cause both ends of the arcuate surface to move in unison toward and from the drum; and the guide means on the frame being held in guiding position by yieldable friction means, and being movable to successive new positions by the guide means on the shoe upon successive engagements of the arcuate surface with the drum, to reposition it successively in accordance with wear of the arcuate surface to correspond with the changed positions of the guide means on the shoe effected by said wear.

LYNN S. BURGETT.

REFERENCES CITED

The following references are of record in the file of this patent:

UNITED STATES PATENTS

| Number | Name | Date |
|---|---|---|
| 1,410,395 | Fernow | Mar. 21, 1922 |
| 2,016,359 | Corbin | Oct. 8, 1935 |
| 2,314,451 | Liliquist | Mar. 23, 1943 |
| 2,436,880 | Burgett | Mar. 2, 1948 |

FOREIGN PATENTS

| Number | Country | Date |
|---|---|---|
| 454,625 | Germany | Jan. 14, 1928 |